United States Patent [19]

Schehrer et al.

[11] Patent Number: 5,258,860
[45] Date of Patent: Nov. 2, 1993

[54] OPTICAL PHASE ADDER

[75] Inventors: Kevin L. Schehrer, Calabasas; Daniel J. Sox, Northridge; Patricia M. Noblett, Agoura, all of Calif.

[73] Assignee: Rockwell International Corporation, Seal Beach, Calif.

[21] Appl. No.: 744,541

[22] Filed: Aug. 13, 1991

[51] Int. Cl.$^5$ .................. G03H 1/12; G02F 1/135; G02F 1/01
[52] U.S. Cl. ............................ 359/6; 359/4; 359/11; 359/35; 359/72; 358/245
[58] Field of Search .................. 359/3, 4, 6, 11, 10, 359/1, 35, 72, 100, 240, 245, 263

[56] References Cited

U.S. PATENT DOCUMENTS

| | | | |
|---|---|---|---|
| 4,673,257 | 6/1987 | Rokni et al. | 359/299 |
| 4,813,771 | 3/1989 | Handschy et al. | 350/350 S |
| 4,941,735 | 7/1990 | Moddel et al. | 359/79 X |
| 5,042,922 | 8/1991 | Pepper | 359/72 |
| 5,046,824 | 9/1991 | Pepper | 359/72 |
| 5,132,811 | 7/1992 | Iwaki et al. | 359/6 |
| 5,148,323 | 9/1992 | Campbell et al. | 359/738 |

OTHER PUBLICATIONS

Munch and Wuerker, *Applied Optics*, vol. 28, pp. 1312–1317, Apr. 1, 1989.
Karaguleff and Clark, *Optics Letters*, vol. 15, pp. 820–822, Jul. 15, 1990.

*Primary Examiner*—Bruce Y. Arnold
*Assistant Examiner*—David R. Parson
*Attorney, Agent, or Firm*—H. Fredrick Hamann; Harry B. Field

[57] ABSTRACT

A photosensitive element 46 absorbs at least a portion of an incident write beam 40, causing a spatially varying electric field to be applied across a layer of a ferroelectric liquid crystal (FLC) 48, thereby forming a pattern of local polarizations corresponding to the spatially varying electric field. In one embodiment, a signal beam is modulated with a phase variation characteristic of a particular aberrator. The signal beam is then combined with a substantially plane wave reference beam to form interference fringes. These interference fringes are directed as a write beam onto photosensitive layer 46, forming a hologram in FLC layer 48 which can be read optically. An incident beam of light can be diffracted by a hologram formed in the FLC layer, thereby modulating the incident beam of light with the phase variations comprising the hologram. In a preferred embodiment, the phase characteristics of an aberrator 76 are recorded as a hologram in an optically addressed spatial light modulator 10 and that hologram may be used to remove aberrations from an incident probe beam 83 that was modulated by aberrator 76. In a preferred embodiment, a large portion of the incident probe beam 82 intensity will be diffracted into a first order diffraction mode. This corrected probe beam 84 will be a substantially image corrected beam of light.

38 Claims, 7 Drawing Sheets

OPTICAL PHASE ADDER

BACKGROUND OF THE INVENTION

1. Field of the Invention

The present invention relates to active optical devices and, in particular, to active optical devices which sense phase information and then alter the phase characteristics of a beam of optical light on the basis of that sensed phase information.

2. Description of Related Art

For certain applications, it is desirable to have lenses, mirrors or other optical elements which have optical properties that are alterable on demand. For example, one application may require a focusing mirror whose radius of curvature can be switched between two different values. A more specialized application might require a different mirror which has a deformable surface that alters the phase distribution of light reflected from the mirror. Such "alterable" optical elements are generally referred to as adaptive optics. For many applications, high speed and low power performance are necessary to the successful implementation of adaptive optics.

One application of adaptive optics is to improve the imaging performance of optical systems by compensating for optical imperfections or aberrators present in the system. For example, imaging performance may be improved by using adaptive optics to alter the phase distribution of the observed beam of light. If a beam of light carrying an image passes through an aberrator, the aberrator will alter the phase distribution of the beam and distort the image carried by the beam. When the aberrated light beam is reflected from a suitably deformed adaptive optic element, the phase distribution of the beam of light is altered in accordance with the deformation of the element's surface. Under appropriate conditions, reflection from the deformed element can subtract substantially all of the phase variation from the aberrated beam of light. Subtracting the phase variation from the light beam has the effect of correcting the image carried by that beam of light, thereby improving the imaging performance of the system.

Using adaptive optics to correct distorted images or to remove aberrations from beams of light has several useful applications. For example, the resolving power of optical telescopes operating within the earth's atmosphere is reduced by atmospheric distortion of the light incident from distant objects. Such atmospheric distortion can be caused by atmospheric turbulence or other local variations in the air's refractive index. Generally, atmospheric distortions such as these cannot be compensated for by fixed mirrors or lenses because the magnitude and pattern of the distortion varies in time. Thus, an adaptive optics solution is highly desirable. Such an adaptive optics solution typically requires some means of measuring the phase characteristics of the atmospheric aberrator. The measured phase characteristics would then be imposed on an alterable optical element to compensate for the effects of the aberrator.

One technique for measuring the phase information characteristic of a given aberrator is to create a hologram of that aberrator. Such a holographic technique is described by Munch and Wuerker in *Applied Optics,* Volume 28, pages 1312–17, Apr. 1, 1989, where it is applied to measuring the constant aberrations introduced to a beam of light by a low quality telescope objective. In that work, a signal beam comprised of plane wave light was passed through the imperfect objective of a telescope. The imperfect objective modulated the signal beam, introducing phase variations to the formerly constant phase wave front. Next, the aberrated signal beam was combined with a plane wave reference beam that was spatially and temporally coherent with the signal beam. The two beams interfered, creating interference fringes that were recorded within a photographic plate. The resulting hologram was used to correct the aberrations of the telescope by placing the hologram in the optical path of the telescope.

When a hologram is formed within a photographic plate, the interference fringe pattern incident on the plate is recorded within the emulsion on that plate. After the plate is developed, the intensity distribution is converted into a quasi two-dimensional pattern of varying indices of refraction. This pattern can be considered one type of diffraction grating which can be used in a transmission mode or, under appropriate conditions, in a reflection mode. When a beam of light is passed through this recording of the interference pattern, the beam of light will be modulated with the original phase distribution. Thus, the original phase distribution can be subtracted from the aberrated beam, correcting the image carried by that beam.

This holographic image correction technique has the disadvantage of being implemented with photographic plates. Photographic plates usually require chemical development which can introduce a several minute delay before a usable hologram is produced. A further disadvantage associated with developing photographic plates is the fact that the plate usually has to be moved from the position where it was exposed to be developed. This can introduce the need for careful alignment of the developed hologram before it can be used.

A second example of the holographic phase recording technique is discussed by Karaguleff and Clark in *Optics Letters,* Volume 15, pages 820–22, Jul. 15, 1990. That work used a nematic-phase liquid crystal device both to record a hologram of an aberrator and as an optical element to compensate for aberrations introduced into an object beam by that same aberrator. In this manner, the nematic-phase liquid crystal device acted both as holographic media and as an adaptive optic element. Two physically distinct operations were performed, almost simultaneously, by the liquid crystal device. First, the hologram of the aberrator was created and recorded in the liquid crystal device. Next, the hologram was used to correct aberrations introduced to an independent beam of light by the same aberration.

A beam splitter was used to divide a plane wave beam of light into a signal beam and a reference beam. The signal beam was passed through an aberrator which distorted the beam, modulating the plane wave light with the phase variations characteristic of that aberrator. Then both the aberrated signal beam and the plane wave reference beam were directed to one surface of the liquid crystal device. The two beams interfered across the surface of the liquid crystal device, creating a two-dimensional interference fringe pattern which was recorded by the liquid crystal device. High intensity portions of the fringe pattern produced local increases in the temperature of the liquid crystal. Because a nematic-phase liquid crystal's index of refraction is temperature dependent, the fringe pattern formed by the combination of the aberrated signal beam with the reference beam produced a hologram comprised of localized index of refraction variations in the liquid crystal device.

The refractive index hologram was utilized in the following fashion to perform image correction on an aberrated light beam. A different, independent beam of light was passed through an object and then through the aberrator that was used to create the refractive index hologram. This "object" beam thus carried the image of the object, distorted by the aberrator. Next, the object beam was passed through the refractive index hologram in an appropriate manner so that the phase variations recorded in the refractive index hologram were subtracted from the object beam. This subtraction acted to compensate for the aberrations in the object beam, causing the aberrations to be removed from the image of the object carried by the object beam. Thus, the refractive index hologram was used to perform image correction.

There are substantial disadvantages associated with this method of image correction. Since the interference fringe pattern is recorded thermally, relatively high optical power densities are usually needed to create this sort of hologram. This high incident power requirement can be reduced by heating the entire liquid crystal device to a temperature close to the liquid crystal transition temperature. In this region, the index of refraction of the liquid crystal device is generally the most sensitive to changes in temperature. While this technique offers improved performance, the higher temperature can sometimes lead to thermal runaway conditions in the liquid crystal device which can substantially degrade the quality of holograms produced in those devices. Furthermore, light scattering is substantially greater when this device is operated near the liquid crystal transition temperature.

An additional disadvantage with the above technique is that the amplitude of the refractive index variations that comprise the refractive index hologram decreases in time. The time constant for this amplitude decay is typically on the order of thirty microseconds. Thus, any image correction usually must be performed rapidly. The thermal runaway problem typically places a limit on the repetition rate that is compatible with this device, as well. Thus, this nematic-phase liquid crystal device is often poorly suited to applications requiring steady-state or near steady-state operation.

Typically, adaptive optical elements such as deformable or segmented mirrors, or those described above, have an essentially analog character in that the deformable or adjustable elements vary continuously and smoothly. For example, in the nematic-phase liquid crystal device, the refractive index variations have a substantially sinusoidal character on a local scale and the amplitude of the variations can vary widely. The refractive index does not change as a step function, rather it changes relatively slowly and continuously. In certain applications it may be desirable to have sharper phase modulating characteristics than are typically available in previous types of adaptive optics elements.

SUMMARY OF THE INVENTION

It is an object of the present invention to provide an improved method and apparatus for holographically recording the phase variations present in a beam of light and to use the recorded hologram to alter a second beam of light, particularly in a manner requiring a relatively uncomplicated electrical and optical arrangement.

These and other objects and advantages are achieved in a phase recording apparatus which passes an incident beam of light to a photosensitive element which absorbs some portion of the incident beam of light, causing a spatially varying electric field to be applied across a layer of ferroelectric liquid crystal. Regions of the ferroelectric liquid crystal have a local index of refraction which can be changed by the application of a sufficiently large local electric field. Application of a sufficient spatially varying electrical field across the ferroelectric liquid crystal layer causes a corresponding pattern of different local indices of refraction. This pattern of varying indices of refraction can be made to act as a diffraction grating.

In one embodiment of the present invention, an optically addressed spatial light modulator is comprised of at least a first substantially transparent, conductive layer, a photosensitive layer, a ferroelectric liquid crystal layer, and a second substantially transparent, dielectric layer. According to one aspect of the present invention, at least the phase variations of an incident optical interference fringe pattern are recorded as a hologram within such an optically addressed spatial light modulator. The hologram recorded in this fashion is essentially comprised of a pattern of local polarization variations within the ferroelectric liquid crystal layer. In a preferred embodiment, these local polarizations are constrained to take substantially one of two values, which causes the hologram formed in this manner to have a substantially binary character. Application of a sufficient local electric field by a photosensitive element causes the local polarization of the ferroelectric liquid crystal layer to switch between two distinct optical states.

According to another aspect of the present invention, a hologram created within an optically addressed spatial light modulator is used to modulate an incident beam of light. In this embodiment, the spatially varying phase pattern recorded within the ferroelectric liquid crystal is used to modulate an incident beam of light. The phase variations recorded within the ferroelectric liquid crystal will be substantially subtracted from an incident beam of light. In one application, the phase variations recorded in the optically addressed spatial light modulator are characteristic of an aberrator the incident beam of light has passed through. Thus, when the beam of light is diffracted from the optically addressed spatial light modulator, the aberration present in the incident beam of light can be substantially removed.

Embodiments of the present invention and advantages associated with those embodiments are described in detail below with reference to the drawings included in this application.

DETAILED DESCRIPTION OF THE DRAWINGS

Optical holography is a technique for obtaining phase information from a signal light beam. A hologram is formed when two light beams, a reference beam and a signal beam, are caused to interfere within a holographic media, that is, a media which can be made to record the intensity pattern of an incident light field. The signal beam typically carries phase variations which are characteristic of an aberrator the signal beam has either passed through or been reflected from. The reference beam is typically a plane wave directed to the holographic recording media where it combines with the signal beam, creating interference fringes within the holographic media, forming a hologram. The hologram thus bears information characteristic of the aberrator and the hologram can then be used to recreate the image of the aberrator or the phase conjugate of the aberrator.

Figure 1:
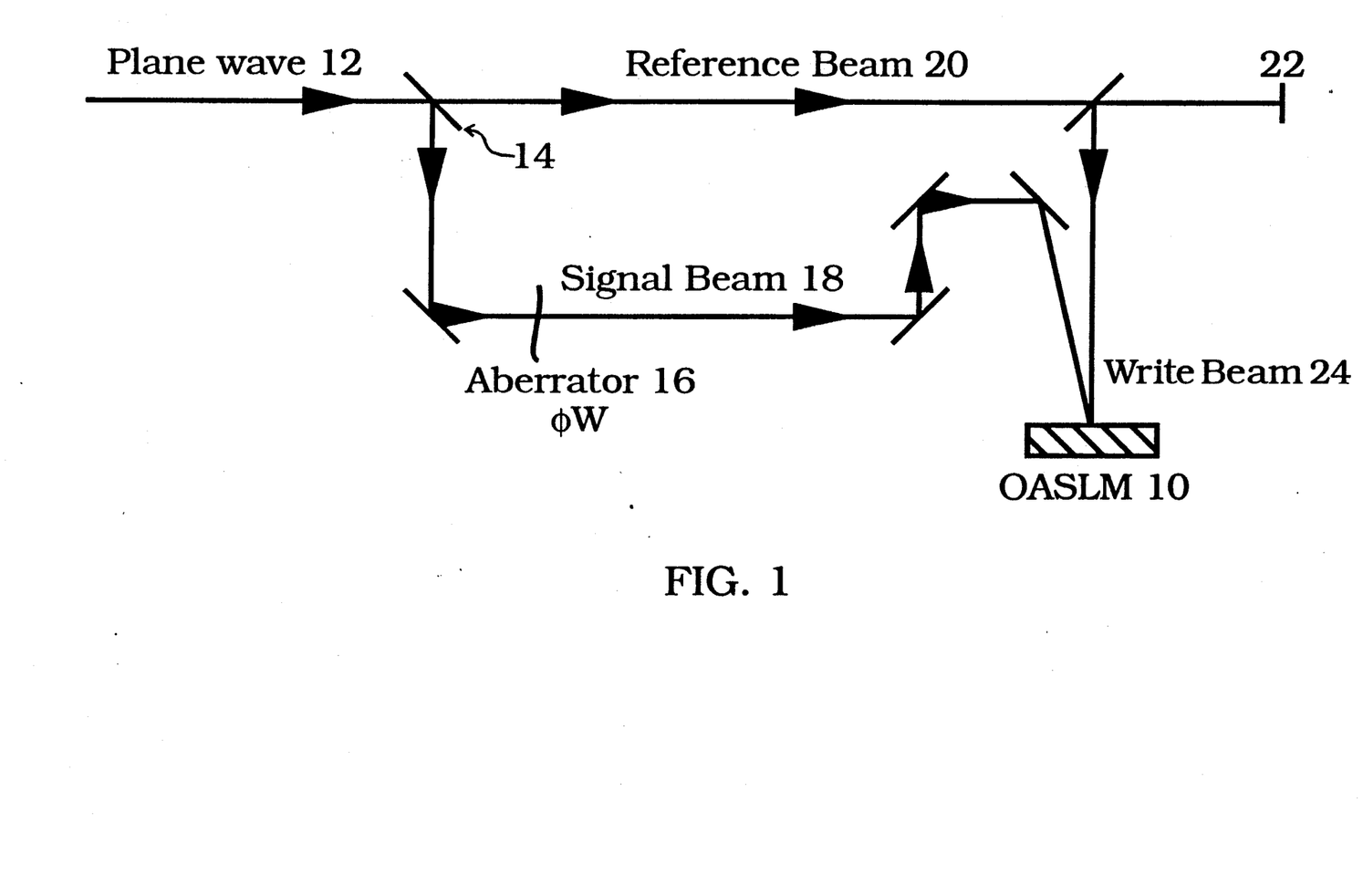
FIG. 1 is a schematic representation of a holographic system in accordance with an embodiment of the present invention.

In a preferred embodiment of the present invention, shown generally in FIG. 1, an optically addressed spatial light modulator 10 (hereinafter, "OASLM") is used to record a hologram. A plane wave beam of light 12 is incident into the holographic system. This beam of light may, for example, be a spatially filtered beam of laser light. The plane wave beam of light 12 is split into two beams by a beam separating element 14 such as a beam splitter. One of the two split off beams is directed toward an aberrator 16 which distorts the light passing through it, forming the signal beam 18. The aberrator 16 alters the plane wave nature of the incident light, introducing a phase variation $\phi W$ to the wave front of the transmitted signal beam 18. This signal beam is then directed toward the OASLM 10.

The other of the beams split off from the incident plane wave beam of light 12 is directed through an optical path to become the reference beam 20 which is combined with the signal beam 18 at the OASLM 10 to form a hologram. The reference beam 20 preferably remains a substantially plane wave beam of light until it is combined with the signal beam 18. The optical path length travelled by the reference beam 20 is usually made equal to the signal beam 18 path length to within a coherence length of the incident plane wave light. Typically an adjustable path length will be incorporated in the reference beam optical path to allow the necessary adjustments. For example, a mirror 22 on a translation stage might be used to adjust the length of the path travelled by the reference beam 20.

When the plane wave reference beam 20 is combined with the signal beam 18 at the OASLM 10, the two beams interfere to create an interference fringe pattern that is characteristic of the phase varying portions of the signal beam. The interference fringe pattern produced in this manner comprises the write beam 24 incident on the OASLM 10 which produces the hologram within the OASLM.

Figure 2:
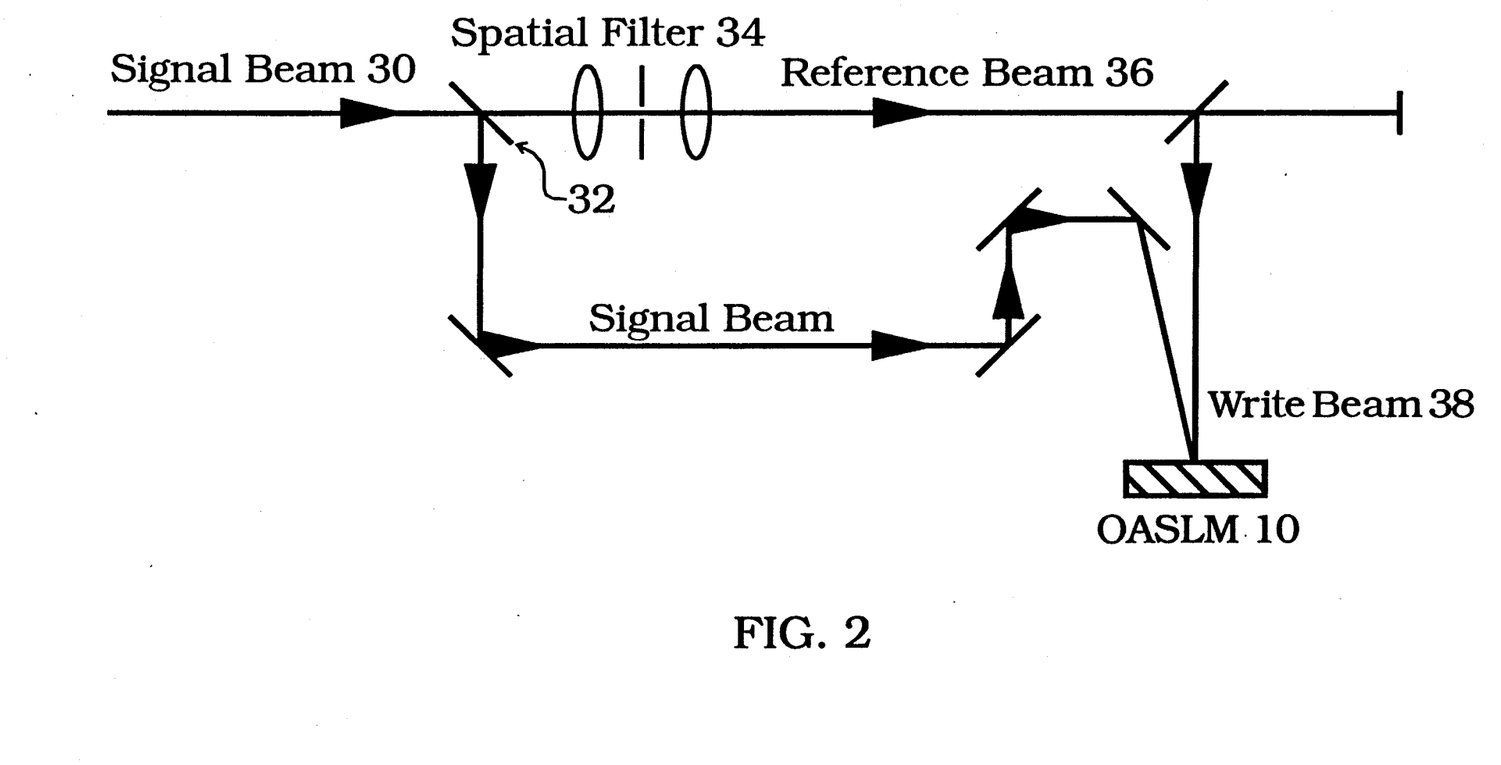
FIG. 2 is a schematic representation of an alternate embodiment of a holographic system in accordance with the present invention.

There are a number of other ways in which a reference beam can be generated. In one alternate embodiment, shown generally in FIG. 2, a signal beam 30 enters a holography system at beam separating element 32. The signal beam 30 has, prior to entering the holographic system, interacted with an aberrator which has modulated the signal beam with the aberrator phase variation $\phi W$. Signal beam 30 is separated into two beams by the beam separating element 32, one of which is directed through a signal beam optical path to the OASLM 10. The other beam is directed to a spatial filter 34, typically comprised of a focusing lens, a pinhole and a collimating lens. Spatial filter 34 filters the phase variations from the beam. (A preferred embodiment of the spatial filter is described in greater detail in U.S. Pat. No. 5,148,323, which issued on Sept. 15, 1992, is entitled "Local Reference Beam Generator" by Blair F. Campbell, Richard B. Holmes, Sam S. Ma and Dennis M. Guthals, and assigned to the assignee of the present application. U.S. Pat. No. 5,148,323 is incorporated herein by reference.) Reference beam 36 leaves the spatial filter as a substantially plane wave beam of light that is spatially and temporally coherent with the signal beam. The signal beam 30 and the reference beam 36 combine to form the write beam 38 that is incident onto the OASLM 10.

Normally, the interference fringe pattern that comprises the write beam incident to the OASLM is a smoothly varying intensity distribution of light. In previous holographic recording techniques, this sort of analog distribution would be recorded as an analog diffraction grating near where the write beam interacts with the holographic media. In accordance with one aspect of the present invention, an optically addressed spatial light modulator ("OASLM") in accordance with one embodiment of the present invention may be used as holographic media to record a type of hologram within an OASLM.

Figure 3:
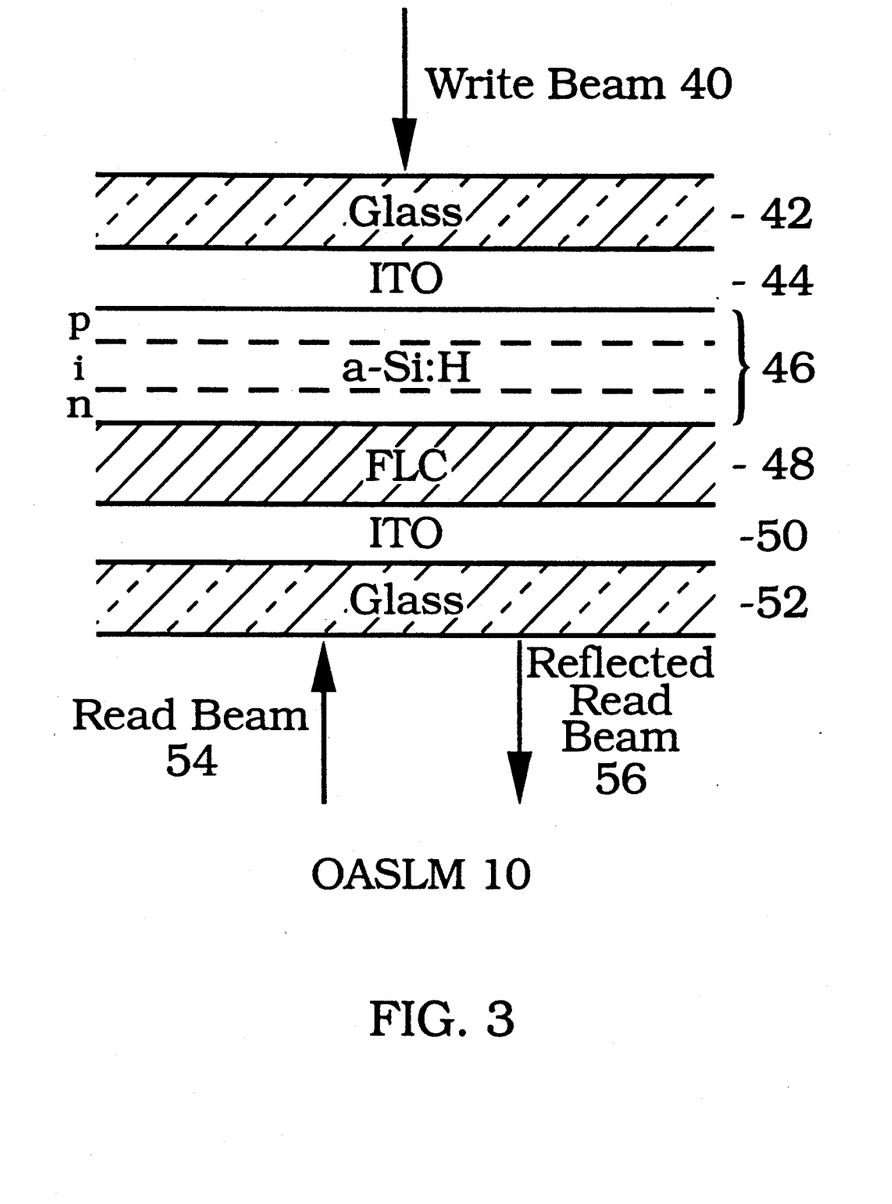
FIG. 3 shows in greater detail the optically addressed spatial light modulator of FIGS. 1 and 2.

An OASLM for recording a hologram in accordance with a preferred embodiment of the present invention is indicated generally at 10 in FIG. 3. The OASLM device itself is commercially available from Displaytech, Incorporated of Boulder, Colo. A write beam 40 enters the OASLM 10 through a glass layer 42 of the OASLM 10. Typically, the glass layer 42 is an optical flat, that is, it is an optical element that transmits light without substantially distorting the transmitted light's wave front. Next, the write beam 44 is incident to a layer of a substantially transparent conductor 44 such as indium tin oxide (hereinafter, ITO). It is desirable that this layer transmit a high level of light incident to it at the write beam wavelength. It is further desirable that this substantially transparent conductor 44 be sufficiently conductive so that it conducts sufficient charge to act essentially as an equipotential surface within the OASLM.

The write beam 40 next passes to a photosensitive element, indicated at 46 of FIG. 3. This element should have a high level of optical sensitivity near the wavelength of the write beam light so as to allow low light level holography with the OASLM. The photosensitive element 46 absorbs incident light, and converts that incident optical energy to a quasi two-dimensional charge distribution at an output of the photosensitive element. It is desirable that the photosensitive element be a two dimensional detector with a high level of spatial resolution. In a preferred embodiment, this photosensitive element 46 is a hydrogenated amorphous silicon PIN photodiode. The operation of this type of detector is well known in the art, and it can readily be configured to produce a two-dimensional charge distribution near its back surface in response to an incident optical energy distribution at the detector's front surface.

Other photosensitive elements that can be configured so that they convert incident optical energy into a charge distribution could be used in this application. Typically, the hydrogenated amorphous silicon PIN detector has certain advantages when used in this embodiment in that it acts as a two-dimensional optical detector with a high degree of spatial resolution. The normal sensitivity obtainable for this sort of detector is well suited for use in the OASLM. The charge distribution formed in the hydrogenated amorphous silicon detector by the incident intensity distribution is sufficiently long lived so as to allow the charge distribution to be translated into a corresponding holographic recording that can be optically sensed.

The optical intensity pattern of the incident write beam 40 is thereby converted to an essentially two dimensional charge distribution approximately at the interface of the photosensitive element 46 and a layer of a ferroelectric liquid crystal (hereinafter, FLC) material 48. In the preferred embodiment of the OASLM indicated generally at 10 in FIG. 3, a layer 50 of a substantially transparent conductor is disposed on the opposite surface of the FLC layer as the next layer of the OASLM. This layer 50 may, for example, be indium tin oxide. On the opposite side of layer 50 is a second layer of glass 52, which is preferably an optical flat. The substantially transparent, conductive layer 50 should be chosen to be sufficiently conductive so as to create a relatively constant potential surface across layer 50. This layer should also be relatively transparent at the wavelength of a read beam 54.

FLC material refers to a particular class of liquid crystals whose constituent molecules can be made to produce a spontaneous local ferroelectric polarization P. These local polarizations affect how light interacts with the FLC in these local regions, which enables layers of these FLC materials to function as electro-optic switching devices. Similar switching devices are the subject of U.S. Pat. No. 4,813,771 to Handschy and Clark, entitled "Electro-optic Switching Devices Using Ferroelectric Liquid Crystals," which is incorporated herein by reference.

As explained in U.S. Patent No. 4,813,771, when a layer of FLC material is placed in an electric field that is directed substantially perpendicular to the plane of the FLC layer, the FLC can be made to switch between two optically distinct states. Thus, when an electric field of one sign is applied across the FLC material, the FLC material will be in one optical state that could be characterized by a particular index of refraction tensor $n_1$. When the opposite sign electric field is applied across the FLC material, it will switch into a different optical state, characterized by a second index of refraction tensor $n_2$. Light of a given linear polarization incident on FLC material in the first state having a local refractive index tensor $n_1$ will be caused to diffract in one way. On the application of the opposite sign electric field to the FLC material, the same beam of light would experience a different local refractive index tensor $n_2$ that would diffract the light in a different way.

In one embodiment in accordance with the present invention, a spatially varying electric field, that is, an electric field which varies in a plane substantially parallel to the plane of a FLC layer, is applied across the layer of FLC material. The application of a spatially varying electric field will produce a pattern of local polarizations in the FLC layer that correspond to the variations in the applied electric field. This distribution of local polarizations of the FLC layer is equivalent to a pattern of different indexes of refraction which, under appropriate conditions, can serve as one type of diffraction grating. Because, in a preferred embodiment of this invention, the FLC layer is constructed so that the local polarizations switch between two distinct optical states, the resulting diffraction grating is comprised of distinct local index of refraction levels. Thus, the resulting diffraction grating has a diffraction characteristic similar to that of a ruled or blazed grating. This has a distinct effect on the performance of the FLC layer as a hologram, which will be discussed in greater detail below.

In the OASLM indicated at 10 of FIG. 3, the incident optical intensity distribution produced by the interfering light beams is incident as write beam 40, which is transmitted to the photosensitive element 46. The light incident to that element is converted into a substantially two-dimensional charge distribution near the interface between the photosensitive element 46 and the FLC layer 48. By fixing the potential of conductive layer 50 with respect to the photosensitive element 46, the substantially two-dimensional charge distribution near the interface between the photosensitive element 46 and the FLC layer 48 applies a spatially varying electric field across the FLC layer 48. The resulting spatially varying electric field distribution can be made to produce a corresponding distribution in the local polarizations within the FLC material, thereby creating a corresponding diffraction grating.

Because the diffraction grating hologram produced in this fashion is formed in a FLC, it has substantial advantages over previous holograms. The polarization switch that is accomplished through the application of the electrical field represents a thermodynamically favorable transition. These polarization states are relatively stable and long lived states, which means that the diffraction grating created by the application of an electric field across the FLC layer will be relatively stable, even if the charge distribution in the photosensitive element dissipates. These FLC polarization patterns are furthermore relatively free from dissipative processes, which also tends to contribute to the stability of the diffraction gratings. A FLC layer effectively has an intrinsic memory for diffraction gratings formed therein.

While the diffraction gratings created in the FLC are relatively stable, these gratings can be erased in a fairly rapid fashion through the external application of an electrical field. When a sufficiently high electrical field is applied across the FLC, all of the local polarizations will be aligned into one of the optical states or the other. The diffraction pattern is completely erased in this process. A similar effect could be obtained by the application of a substantially uniform and sufficiently intense beam of light to the photosensitive element 46. This incident optical intensity pattern would result in a relatively uniform charge distribution and a corresponding uniform field across the FLC. In turn, this charge induced field would cause all of the local polarizations to be switched into one mode.

The local polarization P of a small region of the FLC can be switched from one optical state to its other optical state by the application of an electric field. Because the state change usually occurs fairly abruptly once a threshold voltage is reached, the FLC can be biased to a point where the polarization will switch upon the application of a small additional field. Since the small additional field is applied locally to the FLC layer by the charge collected near the interface between the photosensitive element 46 and the FLC layer 48, and that charge is created by the optical energy incident to the photosensitive element, the OASLM can be configured to respond to low incident light levels. In fact, for one embodiment of the OASLM, holograms have been made at typical optical energy densities of about 10 nJ/cm$^2$.

Figure 4:
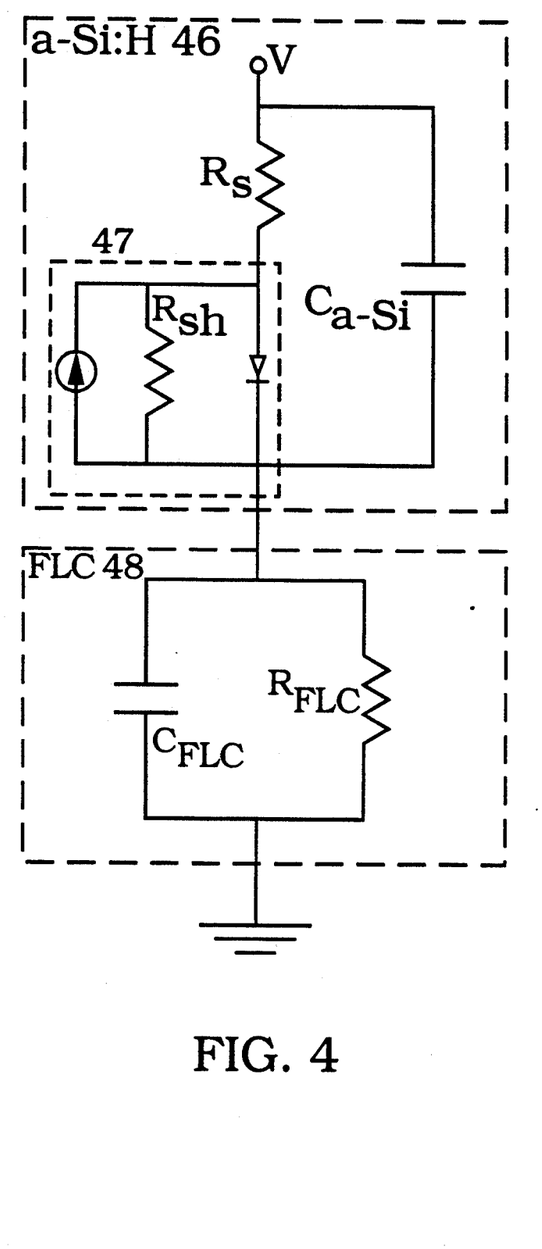
FIG. 4 shows an equivalent circuit representation of a portion of the optically addressed spatial light modulator of FIG. 3.

The embodiment of the OASLM 10 described herein with reference to FIG. 3 is depicted schematically in an equivalent electrical circuit in FIG. 4. In this embodiment, a biasing electrical field is applied to the FLC layer 48 by applying a potential between the two conductive layers 44 and 50. For example, a positive voltage might be applied to layer 44, while layer 50 might be grounded. This bias field is used to adjust the amplitude of the local electric field that should be applied to switch the local polarization from one optical state to another. In one embodiment, an approximately 10 volt potential is placed between the two conductive layers. The FLC layer 48 of FIG. 3 is on the order of one to two microns thick.

FIG. 4 depicts an electrical equivalent circuit of the photosensitive layer 46 and the FLC layer 48. A voltage V is applied to one surface of the photosensitive layer 46. This may be accomplished by applying an electric potential from conductive layer 44 to conductive layer 50. The photosensitive layer 46 may be represented by a resistive element $R_S$, a capacitive element $C_{a-Si}$ and a signal generator 47. The signal generator is depicted as a voltage source across a diode D, connected in parallel with a shunt resistor $R_{sh}$. The output of the photosensitive layer 46 is connected to the input of the FLC layer 48. In FIG. 4, the FLC layer is represented by a resistive element $R_{FLC}$ in parallel with a capacitive element $C_{FLC}$. The output of FLC layer 48 is connected to ground.

As can be seen schematically in FIG. 4, the photosensitive layer 46 acts as a voltage generator in series between conductive layer 44 and the FLC layer 48. At the start of a cycle, an erasing electric field might be applied across the FLC, which would switch all of the local polarizations into a single optical state. The electrical erasing pulse would then be removed, and the OASLM would be in an optical reading portion of its cycle. In response to the incident optical intensity distribution of the write beam 40, the photosensitive element generates a corresponding electric field across the FLC layer 48. The biasing voltage is adjusted such that certain incident optical energy densities will produce local electric fields that are sufficiently strong so as to cause a local portion of the FLC to switch from the first optical state to the second optical state. Optical energy densities that are below a threshold will not cause the local polarizations to switch.

The result of an optical read cycle will then be a quasi two-dimensional pattern of local polarizations in one optical state or in the other. This diffraction grating is a binary recording of the incident interference fringe pattern. Because the amplitudes of the interference fringes are not recorded in this diffraction grating, this type of grating is sometimes known as a phase only hologram. This hologram may then be read out optically so that this recorded phase distribution may be used to modulate a different beam of light. While the hologram recorded in the OASLM can be optically sensed in either a transmission or a reflection mode, for clarity, the reflection mode of reading the OASLM hologram is described herein.

This reflection mode of an embodiment of an OASLM is illustrated generally in FIG. 3 where a read beam 54 is incident on glass layer 52. The read beam is transmitted through the glass 52 and through the substantially transparent conductive layer 50. The read beam 54 is then incident on the polarization pattern recorded in the FLC. This polarization pattern modulates the light which is then reflected back through the conductive layer 50 and the glass 52 where it exits the OASLM as the reflected read beam 56.

In the discussion below, it should be understood that a plane wave beam of light is one which has relatively little phase variation across its wave front. By contrast, a phase varying beam of light is generally one that has substantial phase variations across its wave front. Two beams of light are coherent if, when they are appropriately combined, they will form a stable interference pattern.

Light incident on the FLC will interact with the local polarizations fixed therein which will alter the phase of the incident light by a certain amount for light that is reflected from a region of the FLC with one polarization, and by a different amount for light incident on a region that has the other local polarization of the FLC. In general, this process depends on the exact geometry of the reflection and the polarization of the incident light, as well as the birefringence and the optical switch threshold of the FLC layer. A simplified description of the process is presented first with reference to FIG. 5 which is a schematic representation of a portion of the FLC. Linearly polarized, plane wave light is incident on an FLC layer in which a binary polarization diffraction grating has been written. The plane wave light has a constant phase $\phi_1$ across its wave front. A portion of this light is incident to an area of the FLC with a local polarization $P_1$. When the light incident on this area is reflected, a phase difference $\delta_1$ is introduced to the beam's wave front. For light reflected from the area of the FLC with the local polarization $P_2$, a different phase difference $\delta_2$ is introduced.

Figure 5:
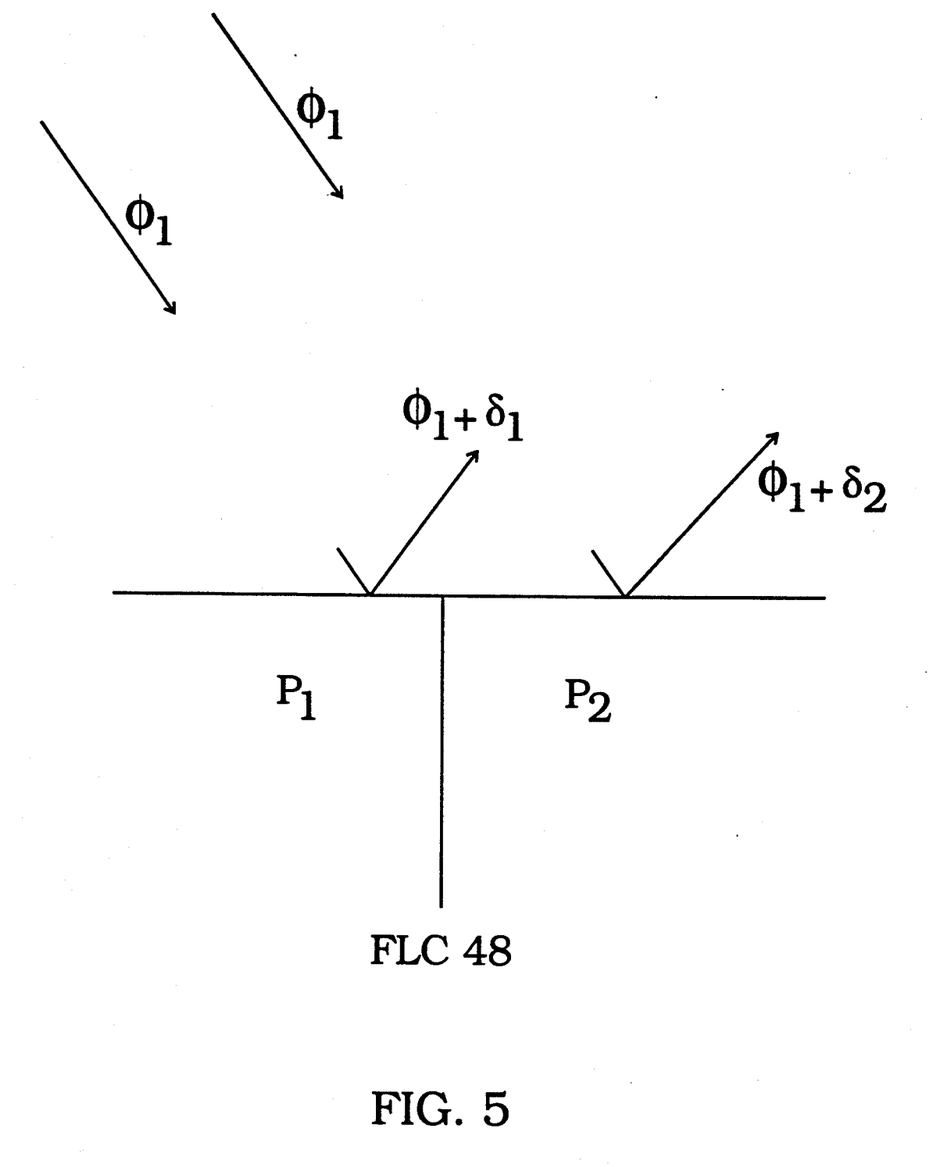
FIG. 5 is a schematic representation of light reflecting from the surface of a ferroelectric liquid crystal where the light interacts with the regions of different local polarization in accordance with one aspect of the present invention.

Neglecting the phase difference introduced by the physical separation of the two different regions of the FLC, a phase difference of $\delta_2 - \delta_1$ has been introduced between the two beams of light. The incident plane wave light has been modulated so that it no longer has a constant phase wave front. Rather, the reflected wave will have a phase variation across its wave front that corresponds to the pattern of different polarization regions in the FLC layer. Thus the phase modulations present in the interferences fringes at the entrance of the OASLM will be introduced to a beam of light reflected as read beam from the FLC layer.

More generally, the diffraction from the FLC layer is expected to be a more complex function of the incident light field. In the following description, the reflectance from an OASLM according to one embodiment of the present invention is presented in detail with reference to a number of equations. It should be understood that these equations describe a particular embodiment of an OASLM according to the present invention, and that variations from the embodiment depicted by these equations is possible without departing from the scope of the present invention. The equations further make reference to several parameters that are described in detail in U.S. Pat. No. 4,813,771, incorporated by reference above.

Figure 6:
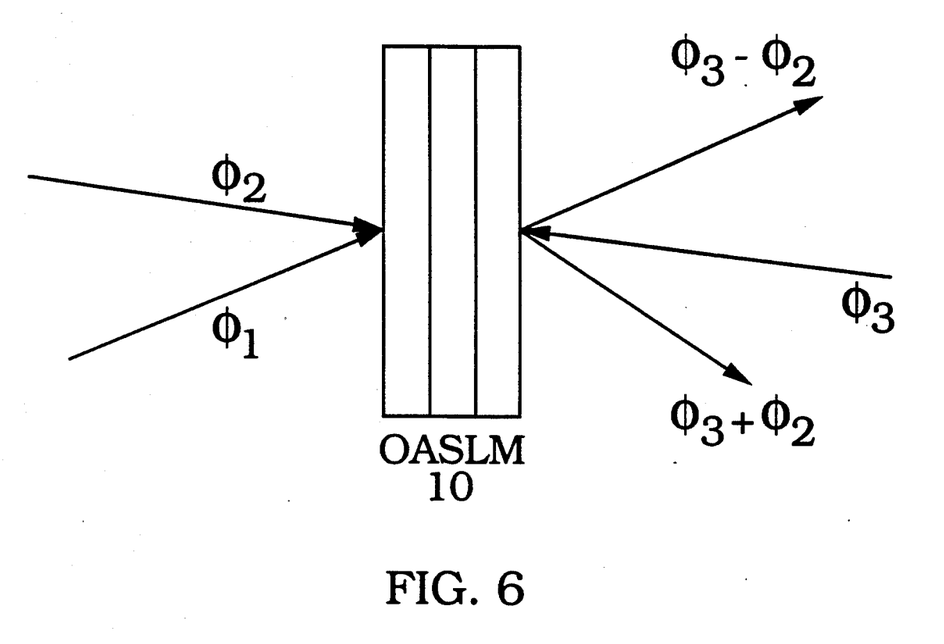
FIG. 6 is a schematic representation of a hologram being written in the optically addressed spatial light modulator of FIG. 3, and the diffraction of a beam of light from the optically addressed spatial light modulator.

As shown in FIG. 6, two beams are incident on the OASLM; a reference beam $\phi_1$ with electric field $E_0$ that is a substantially plane wave beam of light, and a signal beam $\phi_2$ with an electric field $E_w$ modulated with phase $\phi_w$. The electric fields for the reference and signal beams are:

$$E_0 = \frac{e_0}{2} (\exp(-ik_0 \cdot r) + c.c.)$$

and, $$E_w = \frac{e_w}{2} (\exp[-ik_0 \cdot r - i\phi_w(u,v,z)] + c.c.)$$

respectively. Here, u-v-z is a set of Cartesian coordinates having z orthogonal to the plane of the photosensitive element, with u and v lying in the plane of the element. The notation "c.c." represents the complex conjugate of the preceding term in the exponential in the above equations.

For an arbitrary write beam, $\phi_w$ depends on z. In a preferred embodiment according to the present invention, the aberrator that produces $\phi_w$ is thin, the aberrator is imaged onto a plane in the photosensitive element and the photosensitive element is relatively thin with respect to the depth of focus of the imaging system. For example, in an embodiment according to the present invention where a hydrogenated amorphous silicon PIN photodiode is used as a photosensitive element, the photodiode can be approximately 2 microns thick. In such an embodiment, $\phi_w$ is substantially independent of z, allowing the z dependence of $\phi_w$ to be neglected.

The reference beam is then combined with the signal beam at the OASLM to form the write beam, which is comprised of the interference fringe pattern resulting from the superposition of the two incident fields. In one preferred embodiment, the polarization of the reference beam is parallel to the polarization of the signal beam. The resulting intensity distribution I(u,v) for this configuration is given by:

$$I(u,v) = I_0 + I_w + 2\sqrt{I_0 I_w} \cos[-ku\sin\alpha + \phi_w(u,v)]$$

Here, $\alpha$ represents the angle between the reference beam wave vector and the signal beam wave vector, k represents the magnitude of those wave vectors, and the photosensitive element is assumed to be thin.

The intensity distribution I(u,v) is incident onto the photosensitive element, which causes a spatially varying electric field to be applied across the FLC layer. In one embodiment according to the present invention, when an erase or reset voltage is externally applied across the FLC layer, all of the local polarizations within the FLC will be switched to one optical state. For clarity, this "off" state will be referred to as the DOWN state. When the reset voltage is removed, those regions of the FLC where the local electric field exceeds a certain threshold voltage will switch into the "on" state, referred to as the UP state.

When a sufficiently large local electric field is applied, the index ellipse, which is a representation of the local index of refraction tensor, is rotated through an angle $\Delta$ so as to minimize the free energy of the FLC. This microscopic phenomena is reflected in a local region of the FLC switching from DOWN to UP in response to the application of an above threshold local electric field. Thus, when an incident optical intensity distribution causes the photosensitive element to locally apply an electric field in excess of the threshold field, that intensity is recorded as a region of FLC material being switched to the UP state.

In this manner, a hologram is created which corresponds to the optical intensity distribution and is comprised of a pattern in the FLC layer where some of the regions are in the UP state and the other regions are in the DOWN state. This binary pattern of local polarizations can be read out by an incident beam of light. Light reflected from UP regions of the FLC will be reflected differently than light reflected from DOWN regions. For a probe beam $E_P$, the field of the reflected beam of light will be $E_R = R^* E_P$. The reflectance matrix R is given by:

$$R = \frac{R_m}{\pi} \sum_m \frac{1}{m} \exp[im(gu - \phi_W)] *$$

$$\begin{pmatrix} (C^2 e^{i\delta} + S^2) e^{im\pi} S_m' + e^{i\delta} S_m & (e^{i\delta} - 1) CS e^{im\pi} S_m' \\ (e^{i\delta} - 1) CS e^{-im\pi} S_m' & (C^2 + S^2 e^{i\delta}) e^{um\pi} S_m' + S_m \end{pmatrix}$$

where $$C \equiv \cos\theta, \quad S \equiv \sin\theta$$

$$S_m \equiv \sin\left(\frac{mg\Delta}{2}\right), \quad S_m' \equiv \sin\left(\frac{mg\Delta'}{2}\right)$$

In these equations, $R_m$ is the reflectance of the FLC-amorphous silicon interface and m is the order of the diffraction mode. The threshold conditions which govern the threshold potential at which a local region of the FLC will switch from a DOWN state into an UP state are determined by the type of FLC used, as well as on the geometry of the OASLM. The threshold conditions for a preferred embodiment according to the present invention can be determined from U.S. Pat. No. 4,813,771. The term $\Delta$ is determined from those threshold conditions, $\delta$ is determined from the birefringence of the FLC, and g is determined from $\alpha$. These terms are constrained by the following equations:

$$\Delta + \Delta' = \lambda_g, \quad \lambda_g = \frac{2\pi}{g}$$

$$\delta = 2\pi * 2t * \frac{\Delta n}{\lambda}$$

The term $\delta$ represents the phase delay of one field polarization component of the incident probe beam with respect to the other polarization component, $\lambda$ is the wavelength of the probe beam, and t is the thickness of the FLC.

The hologram can be read out by an incident probe beam. In general, a probe beam would have been modulated by some phase variation $\phi_I$ representative of an image carried by the probe beam. Since, in a preferred embodiment according to the present invention, this probe beam has passed through the same aberrator as the signal beam, the probe beam has also been modulated with the phase variations $\phi_w$ characteristic of that aberrator. The field of the probe beam is described by:

$$E_P = \frac{e_P}{2}(\exp[-ik_P \cdot r - i\phi_r(u,v) - i\phi_W(u,v)] + c.c)$$

In a preferred embodiment of the invention, the write beam is directed substantially perpendicularly into the OASLM, as is the probe beam. The intensity of the diffracted beam will then be given by $E_P^{T*}R^*R^*E_P$. The $m = -1$ order diffraction mode will be diffracted at an angle $\alpha$ with respect to the direction of specular reflection from the incident probe beam. This order mode has the phase variations characteristic of the aberrator subtracted from its phase, substantially correcting the aberrations. All other diffraction modes will be aberrated at least as much as the incident probe beam.

The intensity of the corrected diffraction mode will be given by:

$$I_C = I_P \frac{R_M^2}{\pi^2} \left[ \sin^2\left(\frac{g\Delta}{2}\right) + \sin^2\left(\frac{g\Delta'}{2}\right) - 2(\cos^2\theta + \cos\delta\sin^2\theta)\sin\left(\frac{g\Delta}{2}\right)\sin\left(\frac{g\Delta'}{2}\right) \right]$$

where $I_P$ is the intensity of the pump beam. The diffraction efficiency is independent of the probe beam polarization, but dependent on the birefringence, which gives $\delta$, as well as on the threshold conditions. In a preferred embodiment according to the present invention, these conditions are chosen so that $\delta = \pi$ radians, $\Delta = 90°$ and $\Delta = \Delta'$. In practice, this last condition may be accomplished by adjusting the voltage across the FLC layer to maximize the optical energy in the corrected mode. In this embodiment, the $m = 0$ or zero order diffraction mode has no intensity diffracted into it. Assuming complete reflection from FLC-amorphous silicon interface, the corrected, $m = -1$, mode has over 40% of the incident power diffracted into it. In practice, imperfections may cause some power to be diffracted into the zero order diffraction mode. Other embodiments can also be used to perform image correction according to this invention.

In one embodiment, shown generally in FIG. 6, the OASLM can be used to record a hologram and to modulate a probe beam with the phase pattern recorded on that hologram. A phase varying beam of light $\phi_2$ interferes with a plane wave beam of light $\phi_1$ at the write beam entrance to the OASLM 10. In response, a diffraction grating is formed which can be read by a probe beam of light incident from the read beam entrance of the OASLM 10. A read beam, indicated in FIG. 6 as $\phi_3$, is incident to the diffraction grating hologram within the OASLM 10. The incident read beam $\phi_3$ is diffracted from this diffraction pattern in the previously discussed fashion. In a preferred embodiment, there will be no zero order diffraction mode, and most of the reflected optical energy will be diffracted into the first order diffraction modes. The first order diffraction modes are indicated as $\phi_3 - \phi_2$ ($m = -1$) and $\phi_3 + \phi_2$ ($m = 1$); the higher order modes are not shown in FIG. 6. One of the first order diffraction modes, $\phi_3 - \phi_2$, has the phase variations recorded from the incident phase varying beam $\phi_2$ subtracted from the phase variations present in the incident read beam $\phi_3$. The other first order diffracted beam has the phase variations from the incident beam $\phi_2$ added to it, and the higher order diffraction modes have greater levels of modulation.

In accordance with a further aspect of the present invention, the embodiment of the OASLM illustrated in FIG. 6 can be used for altering the phase distribution of read beams. For example, this embodiment can be used to remove aberrations from a read beam, thereby performing image correction on that read beam. If $\phi_2$ represents a plane wave that has passed through an aberrator, the phase varying portions of $\phi_2$ will be a phase description of the aberrator. When a read beam $\phi_3$ that carries an image and has passed through the same aberrator is diffracted from the OASLM as shown in FIG. 6, one of the first order diffracted modes will have the phase description of the aberrator subtracted from it. Because $\phi_3$ had been modulated by the phase variations introduced when it passed through the aberrator, the image carried by $\phi_3$ is aberrated. The first order diffracted mode indicated by $\phi_3 - \phi_2$ then has the phase description of the aberrator subtracted off, removing the aberration from the image carried by $\phi_3$. In this fashion, the OASLM can be used for image correction.

Figure 7:
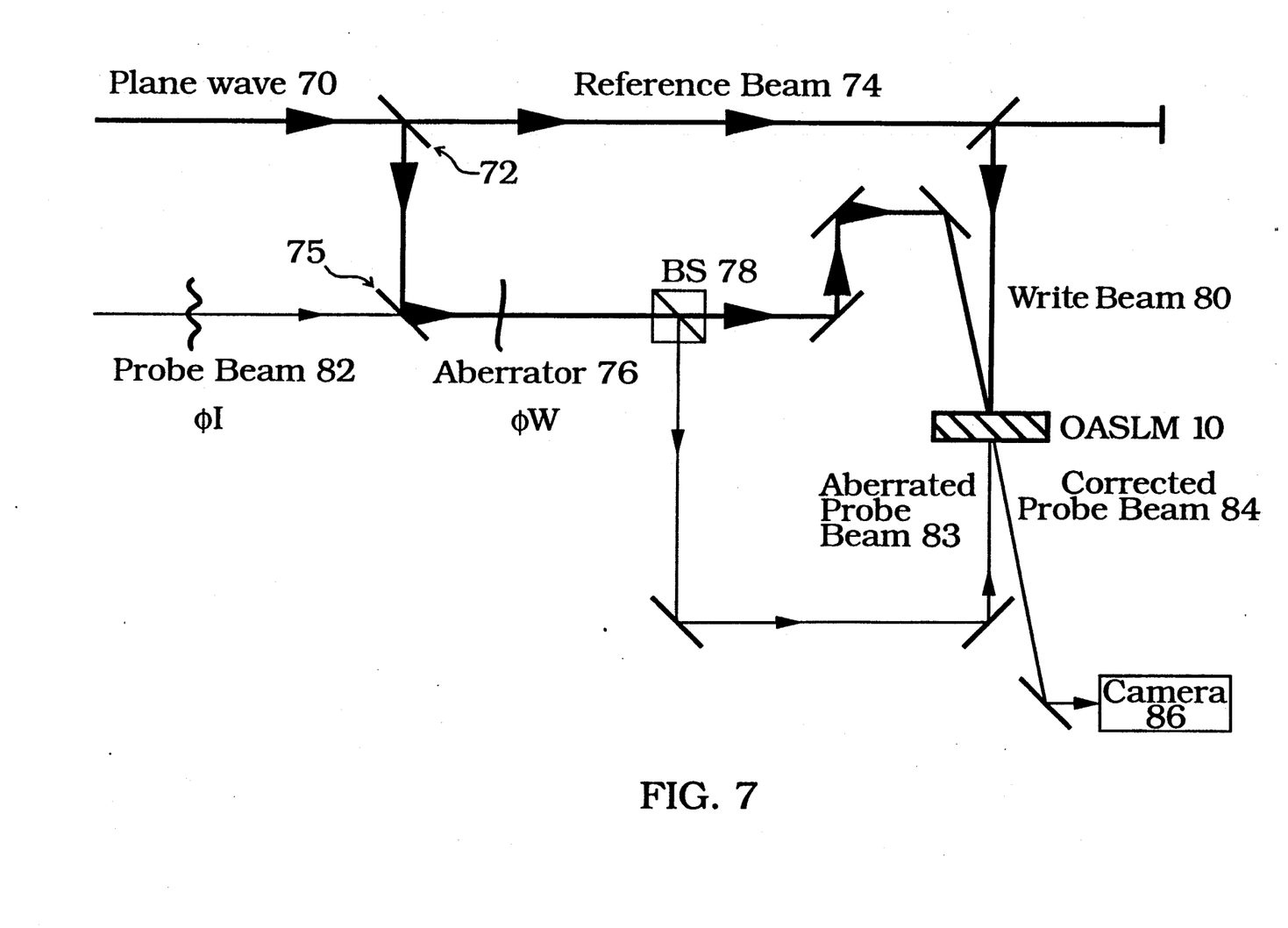
FIG. 7 is a schematic representation of a holographic system in accordance with a preferred embodiment of the present invention.

An embodiment further illustrating the use of an OASLM for image correction is shown generally in FIG. 7. A plane wave beam of light 70 enters the optical system at a beam combining element 72 where it is split into two beams, one of which is the reference beam 74. The reference beam 74 remains a plane wave beam of light as it is directed through an optical path to an OASLM 10. The other beam split off from the incident plane wave beam 70 is reflected by a beam combining element 75 from which the split off beam is directed through an aberrator 76. The aberrator 76 modulates the split off plane wave beam as it passes through the aberrator, introducing a phase variation $\phi W$ to that beam. The now aberrated signal beam then passes through a beam separating element 78 which is preferably highly transmissive at the wavelength of the incident plane wave 70. This may be accomplished, for example, by making the incident plane wave linearly polarized in a certain direction and using a polarization dependent element as the beam separating element 78.

The aberrated signal beam is then directed to the surface of the OASLM 10 where it is combined with the reference beam 74 to form the write beam 80. The reference beam should be spatially and temporally coherent with the aberrated signal beam so that the two beams will interfere. It is desirable to match the power in the reference beam with that of the aberrated signal beam so that the resulting interference fringe pattern has the maximum fringe contrast. The other well known conditions for performing holography should preferably be practiced here as well. A phase only hologram is thus created in the form of a binary polarization diffraction grating at the read surface of the OASLM 10.

At the same time that the hologram is formed at the read surface of the OASLM 10, a probe beam 82 enters the holography system at beam combining element 75. In a preferred embodiment, this probe beam is linearly polarized perpendicular to the polarization of the plane wave incident beam 70. (In FIG. 7, a perpendicular polarization is represented by a thick line and a parallel polarization is represented by a thin line.) The probe beam 82 carries an image on it, which image can be characterized by the phase distribution φI characteristic of that image. Probe beam 82 is then passed through the aberrator 76 where it is modulated with the aberrator phase characteristic φW which distorts the image carried by the probe beam. Beam separator 78 removes the probe beam 82 from the signal beam optical path, redirecting the probe beam toward the read side of the OASLM 10.

The aberrated probe beam 83 is incident on the hologram diffraction grating of the OASLM 10 which diffracts the probe beam as disclosed above. In a preferred embodiment, the phase variation φW introduced by the aberrator 76 is substantially subtracted in one of the first order diffraction modes. This corrected probe beam 84 carries a substantially undistorted image which is approximately characterized by the phase variation φI. The image carried by the corrected probe beam 84 is recorded by a camera 86.

In one preferred embodiment, it is desirable that the probe beam and the write beam be accurately registered with respect to each other. That is, the undulations in the phase fronts of the respective beams that were caused by the aberrator should be made to substantially match at the plane of the FLC within the OASLM. It is desirable that this registration be made so that it is accurate to within the characteristic size of the aberrations. Less accurate registration will generally cause the diffracted beams to be more aberrated than the write beam. Care should generally be taken to ensure that the phase fronts of the respective beams are not substantially inverted or rotated with respect to each other in this embodiment.

Other embodiments of the present invention are readily apparent to one normally skilled in the art. For example, the embodiment depicted in FIG. 7 might be altered by using a self-referencing technique similar to the embodiment shown in FIG. 2. For other applications, it might be desirable to use an OASLM to modulate a beam of light with some desired phase pattern. In such an application, an electric field pattern might be generated by writing an optical pattern on the photosensitive element of the OASLM. That pattern would then become the corresponding phase pattern that would modulate the light incident on the read side of the OASLM.

An OASLM according to the present invention could also be constructed as a transmission device. In one such embodiment, the OASLM indicated generally at 10 of FIG. 3 could be used in transmission mode if the read beam is selected to comprise sufficiently long wavelength light so that the energy of a photon of the read beam light is less than the bandgap energy of silicon. In other embodiments of an OASLM according to the present invention, different bandgap materials might be used to form a photosensitive element that could be sensitive at different wavelengths of light, or such materials could be transmissive in certain desired ranges.

The above invention has been described with reference to certain preferred embodiments. For example, the present invention is applicable to optically readable holograms, and to systems where the phase variations recorded in a hologram are used to modulate an optical beam of light. Other applications are similarly possible. Thus, it is to be understood that what has been described is merely illustrative of the principles of the invention and that numerous arrangements in accordance with this invention may be devised by one skilled in the art without departing from the spirit and scope thereof.

What is claimed is:

1. A method for modulating an incident probe beam of light comprising the steps of:
   combining a signal optical beam with a reference optical beam to form interference fringes, said interference fringes corresponding to a pattern of phase variations present in said signal optical beam;
   passing said interference fringes to an optically addressed spatial light modulator, thereby causing a hologram to be formed in said optically addressed spatial light modulator, said hologram comprising a pattern of local indices of refraction corresponding to said interference fringes, wherein said local indices of refraction can take substantially one or another of two predetermined values; and
   diffracting an incident probe beam of light from said hologram;
   wherein said pattern of phase variations is characteristic of an aberration present in said incident probe beam of light; and
   diffracting said probe beam of light causes said pattern of phase variations to be subtracted from said incident probe beam of light such that at least a portion of said aberration present in said incident beam of light is removed.

2. The method of claim 1 wherein said incident probe beam of light is diffracted by passing said incident probe beam of light through said hologram.

3. The method of claim 1 wherein said incident probe beam of light is diffracted by reflecting said incident beam of light from said hologram.

4. The method of claim 1 such that when said incident probe beam of light is diffracted from said hologram, there is substantially no optical energy diffracted into a resulting zero order diffraction mode.

5. The method of claim 1 wherein a region characterized by a local index of refraction having a first predetermined value introduces a first phase shift value to light diffracted from said region, and a region characterized by a local index of refraction having a second predetermined value introduces a second phase shift value to light diffracted from said region.

6. The method of claim 5 wherein said first phase shift value differs from said second phase shift value by approximately pi radians.

7. A method for recording a hologram comprising the steps of:
   combining a signal optical beam with a reference optical beam to form interference fringes;
   passing said interference fringes to a photosensitive element comprising an array of photodiodes, said photosensitive element being disposed on a layer of ferroelectric liquid crystal, said photosensitive element absorbing some portion of the optical energy present in said interference fringes, thereby causing an electric field to be applied across said layer of ferroelectric liquid crystal;
   said electric field causing a hologram to be recorded within said layer of ferroelectric liquid crystal.

8. The method of claim 7 wherein said hologram comprises a spatially varying pattern of local indices of refraction.

9. The method of claim 8 wherein said spatially varying pattern of local indices of refraction is formed by each of said local indices of refraction taking substantially one or another of two predetermined values.

10. The method of claim 7 wherein said interference fringes are passed through a first layer of substantially transparent conductor disposed on said photosensitive element; and wherein said electric field is maintained across said layer of ferroelectric liquid crystal by a second layer of substantially transparent conductor.

11. The method of claim 10 further comprising the step of applying an erasing electrical field between said first layer of substantially transparent conductor and said second layer of substantially transparent conductor to thereby cause said hologram to be erased.

12. The method of claim 7 wherein said array of photodiodes comprises a PIN junction formed in hydrogenated amorphous silicon.

13. A method for modulating an incident beam of light comprising the steps of:

forming a hologram within a layer of ferroelectric liquid crystal, said hologram comprising a recording of a pattern of phase variations characteristic of an aberration present in an incident beam of light; and diffracting said incident beam of light from said hologram such that said pattern of phase variations is subtracted from said incident beam of light to remove at least a portion of said aberration present in said incident beam of light.

14. The method of claim 13 wherein said incident beam of light is diffracted by passing said incident beam of light through said hologram.

15. The method of claim 13 wherein said incident beam of light is diffracted by reflecting said incident beam of light from said hologram.

16. A method for modulating an incident beam of light comprising the steps of:

forming a hologram comprised of a pattern of local polarizations within a layer of ferroelectric liquid crystal;

wherein each said local polarizations has one of a first polarization value or a second polarization value, such that light diffracted by one of said local polarizations having the first polarization value will be phase shifted by a first phase shift value and light diffracted by another of said local polarizations having the second polarization value will be phase shifted by a second phase shift value; and diffracting an incident beam of light from said hologram such that said pattern of local phase variations is subtracted from one of two first order diffraction modes.

17. The method of claim 16 wherein said first phase shift value differs from said second phase shift value by approximately pi radians.

18. The method of claim 16 such that when said incident beam of light is diffracted from said hologram, there is substantially no optical energy diffracted into a resulting zero order diffraction mode.

19. The method of claim 16 wherein said pattern of phase variations is characteristic of an aberration present in said incident beam of light;

said pattern of phase variations being subtracted from said incident beam of light such that at least a portion of said aberration present in said incident beam of light is removed.

20. A method for subtracting aberrations produced by passing an incident beam of light through a particular aberrator comprising the steps of:

passing a signal beam of light through an aberrator, said aberrator modulating said signal beam of light;

combining said modulated signal beam of light with a substantially plane wave beam of light to form interference fringes;

directing said interference fringes to a photosensitive element, said photosensitive element absorbing at least a portion of said interference fringes;

said interference fringes causing said photosensitive element to apply a spatially varying electric field across a layer of a ferroelectric liquid crystal;

said spatially varying electric field causing a hologram to be formed in said layer of ferroelectric liquid crystal, said hologram comprising a pattern of phase variations characteristic of said aberrator;

directing an incident beam of light onto said layer of ferroelectric liquid crystal, said incident beam of light having an aberration produced by said aberrator;

said incident beam of light being diffracted by said hologram, causing said incident beam of light to be modulated by said pattern of phase variations characteristic of said aberrator.

21. The method of claim 20 wherein said pattern of phase variations characteristic of said aberrator is subtracted from said incident beam of light, substantially removing said aberration from said incident beam of light.

22. An apparatus for modulating a probe beam of light comprising:

means for combining a signal optical beam with a reference optical beam to form interference fringes;

an optically addressed spatial light modulator for forming a hologram in response to said interference fringes, said hologram comprising a pattern of local indices of refraction corresponding to a pattern of phase variations present in said signal optical beam, wherein said local indices of refraction can take substantially one or another of two predetermined values; and means for diffracting an incident probe beam of light from said hologram, wherein said pattern of phase variations is characteristic of an aberration present in said incident probe beam of light; and wherein said pattern of phase variations present in said signal optical beam is subtracted from said incident probe beam of light reducing the magnitude of an aberration present in said incident beam of light.

23. The apparatus of claim 22 wherein said incident probe beam of light is diffracted by passing said incident probe beam of light through said hologram.

24. The apparatus of claim 22 wherein said incident probe beam of light is diffracted by reflecting said incident beam of light from said hologram.

25. The apparatus of claim 22 such that when said incident probe beam of light is diffracted from said hologram, there is substantially no optical energy diffracted into a resulting zero order diffraction mode.

26. The apparatus of claim 22 wherein a region characterized by a local index of refraction having a first predetermined value introduces a first phase shift value to light diffracted from said region, and a region characterized by a local index of refraction having a second predetermined value introduces a second phase shift value to light diffracted from said region.

27. The apparatus of claim 26 wherein said first phase shift value differs from said second phase shift value by approximately pi radians.

28. An apparatus for recording a hologram formed from a signal optical beam and a reference optical beam, comprising:
   means for combining the signal optical beam with the reference optical beam to form interference fringes;
   a layer of ferroelectric liquid crystal;
   a photosensitive element comprised of an array of photodiodes disposed on the layer of ferroelectric liquid crystal, said photosensitive element being responsive to said interference fringes to cause an electric field to be applied across said layer of ferroelectric liquid crystal, thereby causing a hologram to be recorded within said layer of ferroelectric liquid crystal.

29. The apparatus of claim 28 wherein said hologram comprises a spatially varying pattern of local indices of refraction.

30. The apparatus of claim 29 wherein said spatially varying pattern of local indices of refraction is comprised of each of said local indices of refraction taking substantially one or another of two predetermined values.

31. The apparatus of claim 28 further comprising a first layer of conductive dielectric disposed on said photosensitive element;
   wherein said layer of ferroelectric liquid crystal is disposed upon a second layer of conductive dielectric.

32. The apparatus of claim 31 further comprising voltage means for applying a voltage between said first and second conductive dielectric layers.

33. The apparatus of claim 28 wherein said array of photodiodes comprises a hydrogenated amorphous silicon PIN diode.

34. A method for performing image correction on a probe beam of light comprising the steps of:
   directing a signal beam of light into an optical system;
   splitting said signal beam of light into a reference beam of light and a modified signal beam of light;
   filtering said reference beam of light to form a substantially plane wave beam of light having substantial spatial coherence with said modified signal beam of light;
   adjusting the optical power of said reference beam of light or of said modified signal beam of light in a phase preserving manner;
   combining said reference beam of light and said modified signal beam of light to form interference fringes;
   forming a phase only hologram in an optically addressed spatial light modulator; and
   diffracting a probe beam of light from said phase only hologram so that said probe beam of light is modulated with a phase pattern characteristic of an aberration present in said signal beam of light.

35. The method of claim 34 whereby the step of diffracting said probe beam of light produces a diffraction pattern in which substantially no optical power is diffracted into the zero order diffraction mode, and produces one first order diffraction mode in which said phase pattern characteristic of an aberration present in said signal beam of light is subtracted from said probe beam of light.

36. The method of claim 35 wherein said aberration present in said signal beam of light is characteristic of an aberration present in said probe beam of light.

37. The method of claim 34 wherein diffracting said probe beam of light from said phase only hologram modulates said probe beam of light with a pattern of binary phase variations.

38. The method of claim 34 wherein the optical power is adjusted by passing one or both of said reference beam of light and said modified signal beam of light through a phase preserving optical amplifier.

* * * * *